UNITED STATES PATENT OFFICE.

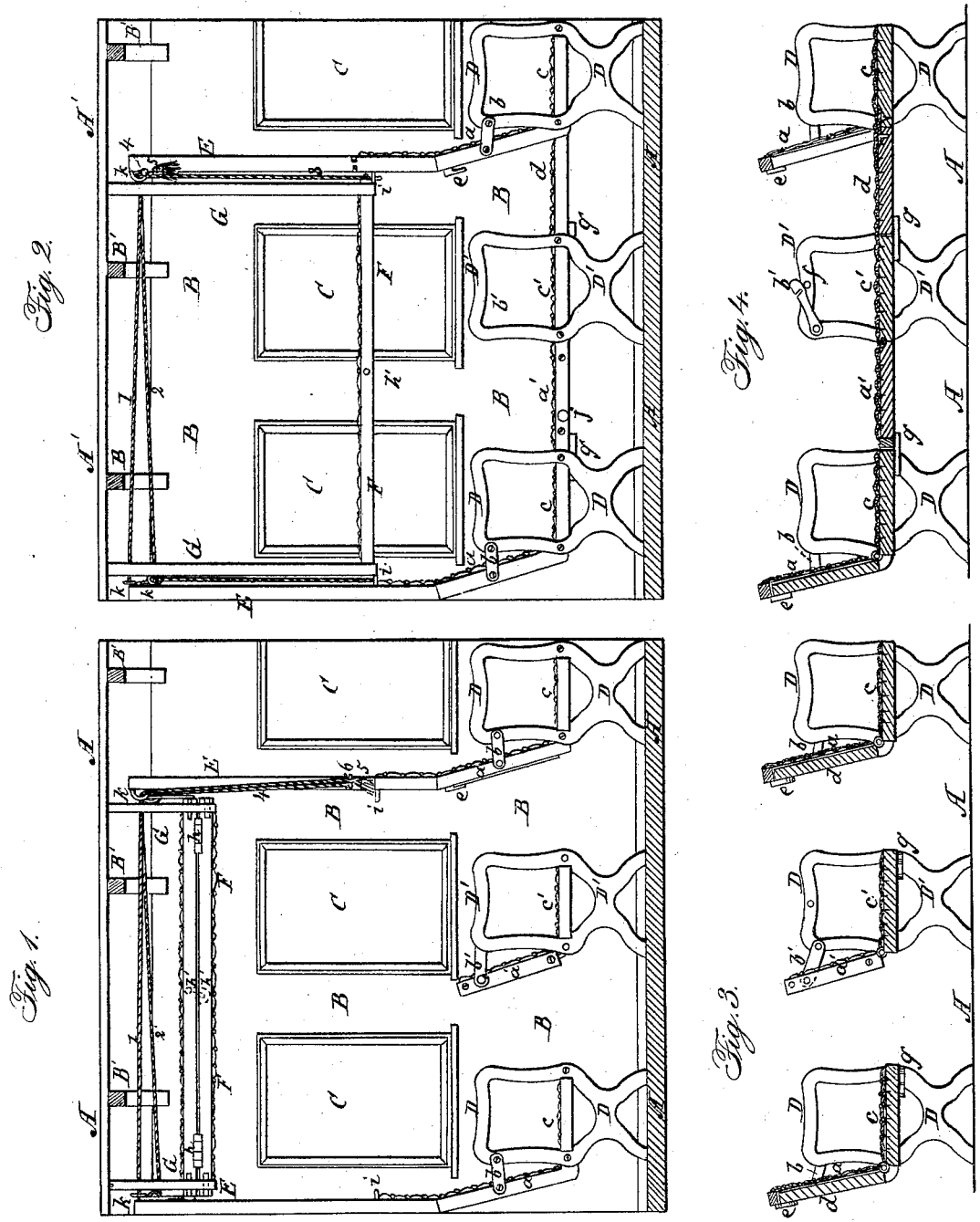

JOHN DANNER, OF CANTON, OHIO, ASSIGNOR TO HIMSELF AND J. M. JAY, OF SAME PLACE.

SLEEPING-CAR.

Specification of Letters Patent No. 25,814, dated October 18, 1859.

*To all whom it may concern:*

Be it known that I, JOHN DANNER, of Canton, in the county of Stark and State of Ohio, have invented certain new and useful Improvements in Sleeping-Cars; and I do hereby declare that the following is a sufficiently full and exact description thereof to enable those skilled in the art to make and use my improved sleeping-car, reference being had to the accompanying drawings, and to the letters of reference marked thereon, forming a part of this specification, in which—

Figure 1 is a longitudinal section through the center of a car and showing so much thereof as is occupied by three seats, when arranged for sitting or day use. Fig. 2, is a similar section when arranged for sleeping couches or night travel. Fig. 3, is a section on a line with the end of the back $a'$, of the middle seat, the seats with their backs and frames only being shown, and Fig. 4, is a section through the first set of hinges in the middle seat $c'$, and false backs of the seats $c$, $c$.

A, is the bottom of the car, to which the frames D and D', of the seats $c$ and $c'$, are attached.

B, is the side of the car, and which is provided with windows C. The top A' is supported by arched cross pieces B'.

Each side of the car is divided into sections of two seats each, by partitions E, which extend from the side of the car out about half the distance of one seat and up from the top of the back of the seats to the top of the car.

The seat frames D, D', and seats $c$, $c'$, do not differ materially from the ordinary frames and seats in use, but the backs are of different construction.

Each alternate back is made narrower than the others, and is hinged to the seat as shown in the drawings, while each alternate seat is provided with a back $a$, the frame of which is rigidly secured to the seat frame D, while the false backs $d$ thereof are so hinged to the back of the seats $c$, that they can be let down as shown Figs. 2 and 4.

The upper or top part of each of the above sections of the car is provided with a folding bed or couch F, hinged in the middle as shown at $h$ for the purpose of facilitating the folding up thereof as shown in Fig. 1, where the hinged parts of F, are shown folded together and held by the hook $h'$, taking hold of the pin $p''$, while the folded bed or couch F, is drawn up close to the top of the car, and there securely held by means of the straps G, and cords 1, 2, 3, and 4,— the latter being fastened to the four corners of that portion of the folding bed F, which hangs next to the side of the car, while the former are fastened to the two corners of the part, which hangs near the middle of the car, so that as the tassel 5 to which the cords 1, 2, 3, and 4, are all attached (after passing through links or rings $k$, fastened to the top of the car) is pulled. After the two parts of F, have been folded and hooked together, the whole is drawn up to the top of the car and there held in a near and compact manner by slipping the tassel into the staple or open ring 6.

To prepare the car for sleeping or night travel, all that is necessary to do is to turn the buttons $e$ and let down the false bottoms $d$, so as to rest on the buttons $g$, attached to the under side of the middle seats $c'$, and then unhook the arms $b'$ which hold the backs of the middle seats and let them down so as to rest on buttons $g$, all as shown in Fig. 4, when the entire lower part of the car can be used for couches, while each section will be divided by the backs $a$, of the seats $c$.

To arrange the upper part of the car for a similar purpose, the tassel 5, is unhooked from the open ring 6, and the folded part F, let down and unhooked, when it will be sustained by the straps G, and cords 1, 2, 3, and 4; but to render the couch still more secure and also to prevent it from swaying out from the side of the car, the partitions E, are provided each with two staples $i$, one for each corner of that portion of F, which hangs next to the side of the car and into which fits four pins attached to the underside of F, so that while the staples $i$, hold up that portion of F, which rests on them, they at the same time keep it from swinging out so as to obstruct the passage in the middle of the car.

The backs of the seats $c$, are held to their frames D, by straps $b$.

It will be seen that my improvements can be attached to any of the ordinary cars now in use with but little expense, and that the whole of the space occupied by the seat is converted into couches or beds, while at the same time each bed or couch is divided or separated from the one in front and rear of it. Nor does my arrangement at all interfere with the use of the ordinary foot board, which is a great convenience in day travel.

I have designed my car with a view of its being turned at the end of each road. This arrangement, on all long roads, is found to be less objectionable when combined with my simple mode of converting the seats into beds or sleeping couches, than the complex arrangements for using the cars without turning them at the ends of the road.

Another great advantage of my arrangement consists in the fact that during the day, by simply letting down one of the false backs $d$, a neat and comfortable bed or couch can be made for children, and that too without occupying more than a single seat.

If preferred, a thin metallic back can be used between the false backs $d$, and the backs $a$.

Having described my improved sleeping car what I claim and desire to secure by Letters Patent, is:—

1. I claim the combination of the hinged false back $d$, with the permanent back $a$, as and for the purposes set forth.

2. I claim making each alternate back $a$ with a false back $d$, in combination with making each alternate back $a'$, shorter than the backs $a$, and hinged to the seat $c'$, substantially as and for the purposes set forth.

JOHN DANNER.

Witnesses:
 DANIEL GOTSHALL,
 JACOB SHERRICK.